(12) United States Patent
Sueoka et al.

(10) Patent No.: US 8,430,227 B2
(45) Date of Patent: Apr. 30, 2013

(54) CONVEYER DEVICE

(75) Inventors: Hisayuki Sueoka, Tokyo (JP); Hitoshi Tsugawa, Tokyo (JP); Susumu Noguchi, Tokyo (JP)

(73) Assignee: Hirata Corporation, Tokyo (JP)

( * ) Notice: Subject to any disclaimer, the term of this patent is extended or adjusted under 35 U.S.C. 154(b) by 245 days.

(21) Appl. No.: 12/994,274

(22) PCT Filed: May 28, 2008

(86) PCT No.: PCT/JP2008/059771
§ 371 (c)(1),
(2), (4) Date: Nov. 23, 2010

(87) PCT Pub. No.: WO2009/144787
PCT Pub. Date: Dec. 3, 2009

(65) Prior Publication Data
US 2011/0073436 A1    Mar. 31, 2011

(51) Int. Cl.
*B65G 37/00*    (2006.01)
*B65G 43/00*    (2006.01)

(52) U.S. Cl.
USPC .............. 198/346.2; 198/339.1; 198/341.01

(58) Field of Classification Search ............... 198/339.1, 198/341.01, 341.03, 341.05, 346.1, 346.2, 198/470.1, 478.1, 502.1; 414/5, 744.1, 744.3, 414/744.6; 29/429, 430, 431, 468
See application file for complete search history.

(56) References Cited

U.S. PATENT DOCUMENTS

| | | | | |
|---|---|---|---|---|
| 5,197,590 | A | * | 3/1993 | Prim et al. ................... 198/300 |
| 7,233,842 | B2 | * | 6/2007 | Bacchi et al. ................ 700/245 |
| 2002/0104935 | A1 | | 8/2002 | Schweizer |
| 2006/0210386 | A1 | * | 9/2006 | Neutel ....................... 414/744.3 |
| 2008/0267747 | A1 | * | 10/2008 | DiBella et al. ........... 414/225.01 |

FOREIGN PATENT DOCUMENTS

| | | |
|---|---|---|
| JP | 61-187634 | 11/1986 |
| JP | 63-232500 | 9/1988 |
| JP | 3-75942 | 7/1991 |
| JP | 3-504470 | 10/1991 |
| JP | 8-90367 | 4/1996 |
| JP | 8-294833 | 11/1996 |
| JP | 11-197995 | 7/1999 |
| JP | 2002-233921 | 8/2002 |
| JP | 2006-102912 | 4/2006 |
| JP | 2007-69262 | 3/2007 |

OTHER PUBLICATIONS

International Search Report issued Jul. 22, 2008 in International (PCT) Application No. PCT/JP2008/059771.

\* cited by examiner

*Primary Examiner* — Leslie A Nicholson, III
(74) *Attorney, Agent, or Firm* — Wenderoth, Lind & Ponack, L.L.P.

(57) ABSTRACT

A production device includes a plurality of processing units (41 to 45) arranged so as to consecutively perform a plurality of types of processing with respect to workpieces, a transport unit (30) that successively transports the workpieces toward processing units, a plurality of monitor operation panels (80, 90) capable of monitoring the processing in the plurality of processing units and performing an adjustment operation regarding the processing or performing an operation regarding the overall operation and stop, and a plurality of movable holding mechanisms (60, 70) that movably hold the respective monitor operation panels.

10 Claims, 9 Drawing Sheets

CONVEYER DEVICE

BACKGROUND OF THE INVENTION

1. Technical Field

The present invention relates to a production device that performs predetermined processing in a plurality of processing areas to produce, e.g., machine components or electronic components, and more particularly to a production device including an operation panel that enables an operator to monitor entire processing or perform operations as required.

2. Description of the Related Art

Since operation panels utilized to perform various kinds of operations have made the shift from a button type to a touch panel type, initialization or change concerning various kinds of sensors or arithmetic devices, counterchanging control software, and others can be easily performed in addition to functional operations such as conventional activation or stop, and such operation panels are applied in production devices that produce, e.g., machine components or electronic components.

Meanwhile, as a conventional production device, there is known an electronic component mounting device that includes a main body frame, a mounting head that mounts an electronic component on a printed board (a workpiece) arranged on a table of the main body frame, a CCD sensor that acquires an image of the printed board, an arithmetic unit that calculates a hole position in the printed board from picture data of the CCD sensor, a correcting operation panel that corrects mounting position data (issues a command for moving the printed board) based on a calculation result obtained from the arithmetic unit, a liquid crystal panel display (a monitor) that displays a picture or a calculation result, and others, thereby performing one type of processing, i.e., mounting a component (see, e.g., Japanese Unexamined Patent Publication No. 63-232500).

In this production device, since the operation panel and the liquid crystal panel display are fixed at predetermined positions on the main body frame, an operator must move to a front side of the operation panel or the liquid crystal panel display when the operator confirms information displayed in the liquid crystal panel display or operates the operation panel.

Further, as another production device, there is known a bending work device that includes a main body frame, an upper table and a lower table provided to the main body frame, a punch attached to the upper table, a die attached to the lower table, an operation panel disposed to the main body frame through a swiveling arm, and others and that allows an operator to operate a push button on the operation panel at the time of processing when bending a workpiece (see, e.g., Japanese Unexamined Patent Publication No. 2007-69262).

In this device, since the operation panel is supported by the swiveling arm, a direction or a position of the operation panel can be adjusted as required, but its adjustment range is restricted to a predetermined range that an operation can be performed while confirming machining processing in one processing area.

On the other hand, in a production device that sequentially transports workpieces to a plurality of processing areas and successively performs a plurality of types of processing with respect to the workpieces, when the above-described operation panel or monitor is applied, the operation panel or the monitor must be provided to each of a plurality of main body frames that define processing areas where the respective types of processing are performed, a construction is complicated, and the entire processing cannot be monitored at one position, whereby the operation panel and the monitor that are arranged in each processing area must be utilized to perform necessary operations.

SUMMARY OF THE INVENTION

1. Problem to be Solved by the Invention

In view of the above-described problem in the conventional art, it is an object of the present invention to provide a production device that performs predetermined processing in a plurality of processing areas to produce, e.g., machine components or electronic components while achieving simplification of a construction, a reduction in cost, and others, the production device particularly including an operation panel that allows an operator to monitor the entire processing and enables smoothly performing a recovery operation with respect to troubles in each processing area, an operation for it, and others.

2. Means for Solving the Problem

To achieve the above-described object, there is provided a production device according to the present invention that includes a plurality of processing units aligned to continuously perform a plurality of types of processing with respect to a workpiece, a transport unit configured to sequentially transport the workpiece toward the plurality of processing units, a plurality of monitor operation panels having setting and monitoring functions concerning overall activation and stop in the plurality of processing units or setting and monitoring functions concerning each processing, and a plurality of movable holding mechanisms configured to hold the plurality of monitor operation panels so as to be movable toward each of the plurality of processing units.

According to this configuration, in the production device in which the workpieces are subjected to predetermined processing in each of the processing units when the workpieces are sequentially transported to the plurality of processing units by the transport unit, an operator can use at least one of the plurality of monitor operation panels when mainly activating or stopping the device and can also use at least one of the other monitor operation panels when monitoring each of the processing units and adjusting the processing (e.g., adjusting for performing a recovery operation when troubles have occurred). When each of the plurality of monitor operation panels is used in accordance with its function, productivity can be improved.

Further, since the plurality of monitor operation panels can be independently moved toward the plurality of processing units by the movable holding mechanisms, for example, one operator can confirm an operating status of the entire device while monitoring one monitor operation panel and another operator can move another monitor operation panel and monitor each processing unit to confirm presence/absence of a trouble, further one operator can move the plurality of monitor operation panels to a predetermined processing unit at the same time to perform, e.g., a recovery operation with respect to troubles.

Since the monitor operation panels can be moved toward the plurality of processing units as described above, an operator can monitor the entire processing at the time of producing, e.g., machine components or electronic components while achieving simplification of a construction, a reduction in cost, and others, and a recovery operation for troubles that have occurred in each processing unit, an adjustment operation for it, and others can be smoothly performed as required.

In the above-described configuration, it is possible to adopt a configuration that the transport unit includes a rotating table that holds the workpiece and intermittently rotates, and the movable holding mechanisms are formed to hold the monitor operation panels so as to be movable toward the plurality of processing units arranged around the rotating table.

According to this configuration, for example, when workpieces are intermittently transported to the respective processing units by, e.g., an index type rotating table, predetermined processing is performed with respect to the workpieces in the respective processing units.

Here, for example, one operator can activate the device by using, e.g., one monitor operation panel and can stop the activation when a trouble has occurred in a predetermined processing unit, and another operator can monitor each processing unit while moving another monitor operation panel by using the movable holding mechanism and can perform an adjustment operation for recovery in the processing unit when a trouble has occurred.

In the above-described configuration, it is possible to adopt a configuration that the transport unit includes a conveyer that holds the workpiece and intermittently transports it, and the movable holding mechanisms are formed to hold the monitor operation panels so as to be movable toward the plurality of processing units arranged along the conveyer.

According to this configuration, for example, when the workpieces are intermittently transported to the respective processing units by the conveyer that performs linear transport, predetermined processing is performed to the workpieces in the respective processing units.

Here, for example, one operator can activate the device by using, e.g., one monitor operation and can stop the activation when a trouble has occurred in a predetermined processing unit, and another operator can monitor each processing unit while moving another monitor operation panel by using the movable holding mechanism and can perform an adjustment operation for recovery in the processing unit when a trouble has occurred.

In the above-described configuration, it is possible to adopt a configuration that the production device further includes a base on which the plurality of processing units are mounted and fixed and which is configured to be arranged below the transport unit, a support frame fixed on the base, and a plurality of support shafts fixed to the support frame, and the plurality of movable holding mechanisms are rotatably supported with respect to the plurality of support shafts to allow their swiveling motion.

According to this configuration, in a state that the plurality of processing units and the support frame are fixed to the base and respective movable holding mechanisms are supported to the plurality of support shafts fixed to the support frame to allow their swiveling motion, the base can be appropriately located at a desired position with respect to the transport unit. Therefore, for example, the base can be located at the desired position of the relatively long continuous transport unit to perform processing with respect to the workpieces.

In the above-described configuration, it is possible to adopt a configuration that the production device further includes a base on which the plurality of processing units and the transport unit are mounted and fixed, a support frame fixed on the base, and a plurality of support shafts provided upright on the support frame, and the plurality of movable holding mechanisms are rotatably supported with respect to the plurality of support shafts to allow their swiveling motion.

According to this configuration, the production device is formed in a state that the plurality of processing units, the transport unit, and the support frame are fixed to the base and the respective movable holding mechanisms are supported to the plurality of support shafts fixed to the support frame to allow their swiveling motion. That is, it is possible to obtain the production device that can achieve consolidating of the constituent components and space-saving of an installation area on the basis of the base.

In the above-described configuration, it is possible to adopt a configuration that the movable holding mechanism includes a support-side arm rotatably supported by the support shaft to allow its swiveling motion, an end-side arm rotatably connected to an end portion of the support-side arm to allow its swiveling motion, and a suspended arm connected to an end portion of the end-side arm to be suspended downwards and configured to rotatably hold the monitor operation panel at a lower end portion thereof to allow its swiveling motion.

According to this configuration, an articulated arm including the support-side arm, the end-side arm, and the suspended arm can be configured as the movable holding mechanism, and the monitor operation panel can be set and positioned at a desired position within a horizontal plane in a desired direction by swiveling the support-side arm on the support shaft, swiveling the end-side arm on an end portion of the support-side arm, and swiveling the suspended arm on an end portion of the end-side arm.

In the above-described configuration, it is possible to adopt a configuration that the support frame includes a portal frame, and the plurality of support shafts are fixed to an upper portion of the portal frame.

According to this configuration, since the support frame includes the portal frame, the plurality of the movable holding mechanisms can be supported to allow their swiveling motion while simplifying the construction and consolidating the constituent components in a state that the plurality of processing units and the transport unit are mounted and fixed on the base, thereby freely moving the monitor operation units to desired positions in the plurality of processing units.

In the above-described configuration, it is possible to adopt a configuration that the plurality of support shafts rotatably support the respective support-side arms at positions having different heights, and the support-side arm is formed to be longer than the end-side arm.

According to this configuration, the movable holding mechanism supported by the high support shaft can freely swivel and move the monitor operation panel in the range of 360 degrees without being hindered by the other low support shafts and, on the other hand, the movable holding mechanism supported by the low support shaft can freely swivel and move the monitor operation panel to allow its reciprocation except a region where it crosses the high support shaft.

In the above-described configuration, it is possible to adopt a configuration that the plurality of support shafts are arranged to be adjacent to each other in parallel.

According to this configuration, the plurality of movable holding mechanisms can be supported so as to allow their swiveling motion within the horizontal plane while achieving consolidation of the mechanical components.

In the above-described configuration, it is possible to adopt a configuration that the plurality of support shafts are coaxially arranged.

According to this configuration, the plurality of movable holding mechanisms can be formed so as to allow their swiveling motion through an angle of 360 degrees without hindering each other.

3. Advantageous Effect of the Invention

According to the production device having the above-described configuration, in the production device that performs predetermined processing in the plurality of processing areas to produce, e.g., machine components or electronic components while achieving simplification in a construction, a reduction in cost, and others, an operator can monitor the entire processing and smoothly perform a recovery operation for troubles in the respective processing areas (processing units) and an operation for it as required, thereby improving productivity as a whole.

EXPLANATIONS OF LETTERS OR NUMERALS

W workpiece
M, M1, M2, M3 operator
A0 manual processing area
A1, A2, A3, A4, A5, A6 automatic processing area
10 base
20 portal frame
21 longitudinal frame
22 transverse frame
30 rotating table (transport unit)
30' conveyer (transport unit)
31 rotary shaft
32 holding transfer unit
33 mounting portion
40 processing table
41, 42, 43, 44, 45 processing unit
46 acceptable piece carrying-out line
47 rejected piece carrying-out line
50 cover case
51 opening door
52 working door
60 first articulated arm (first movable holding mechanism)
61, 61' first support shaft
62 first support-side arm
63 first end-side arm
64 first suspended arm
70 second articulated arm (second movable holding mechanism)
71 second support shaft
72 second support-side arm
73 second end-side arm
74 second suspended arm
80 first monitor operation panel
81 display unit
82 grip portion
90 second monitor operation panel
91 display unit
92 operation button
93 grip portion

DETAILED DESCRIPTION OF THE INVENTION

The best mode(s) for carrying out the present invention will now be described hereinafter with reference to the accompanying drawings.

As shown FIG. 1 to FIG. 4, this production device includes a substantially rectangular base 10, a portal frame that is provided on the base 10 and extends upwards, a rotating table 30 as a transport unit provided on the base 10, a plurality of processing areas A0, A1, A2, A3, A4, and A5 arranged around the rotating table 30 on the base 10, processing tables 40 arranged in the respective processing areas, a plurality of processing units 41, 42, 43, 44, and 45 arranged in the plurality of processing areas except a part thereof (the later-described manual processing area A0), a substantially rectangular parallelepiped cover case 50 that is provided on the base 10 and covers the whole, a first articulated arm 60 as a first movable holding mechanism and a second articulated arm 70 as a second movable holding mechanism that are provided to the portal frame 20 so as to allow their swiveling motion in a region above the cover case 50, a first monitor operation panel 80 held by an end portion (a lower end portion) of the first articulated arm 60, a second monitor operation panel 90 held by an end portion (a lower end portion) of the second articulated arm 70, and others.

Figure 2:
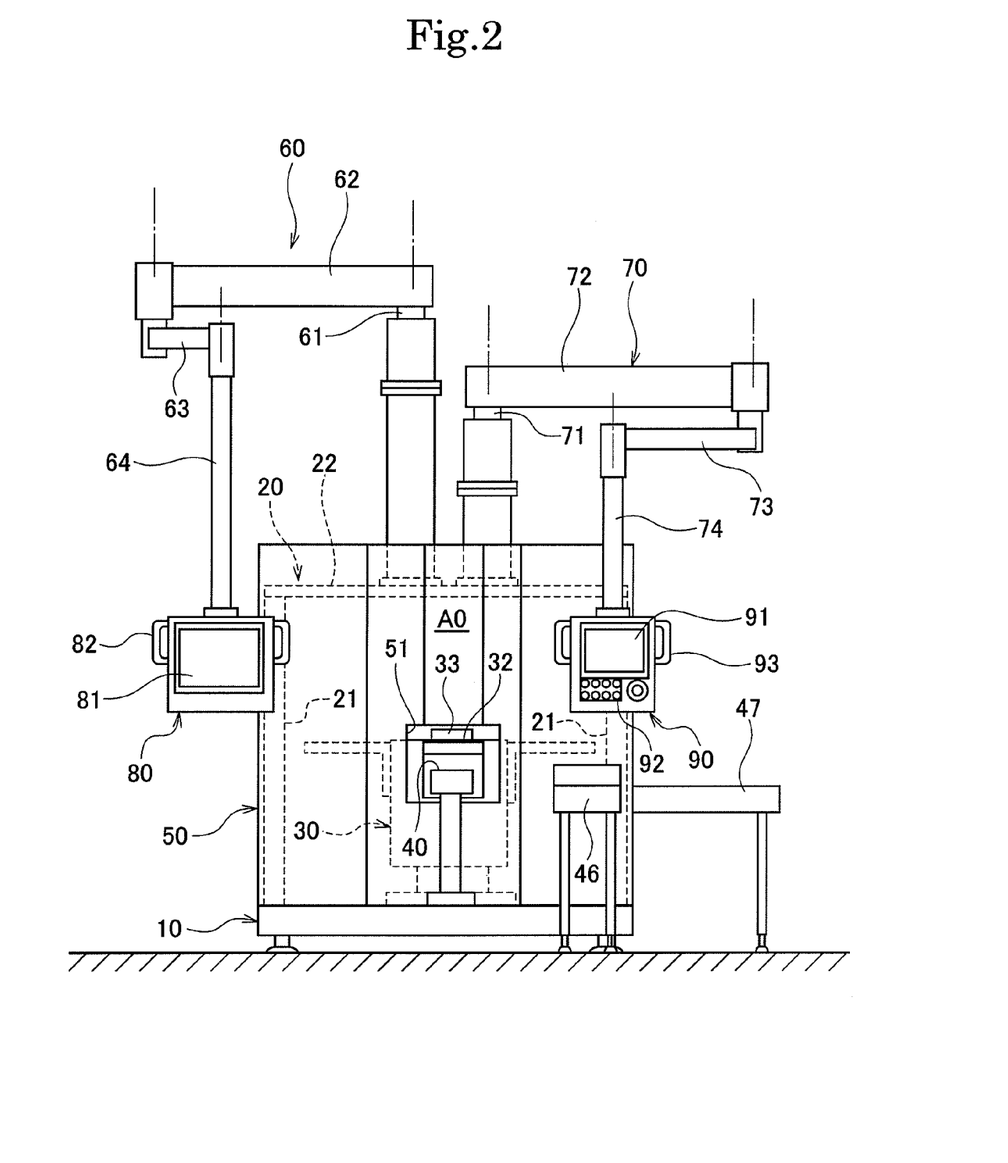
FIG. 2 is a front view of the production device depicted in FIG. 1.
Figure 3:
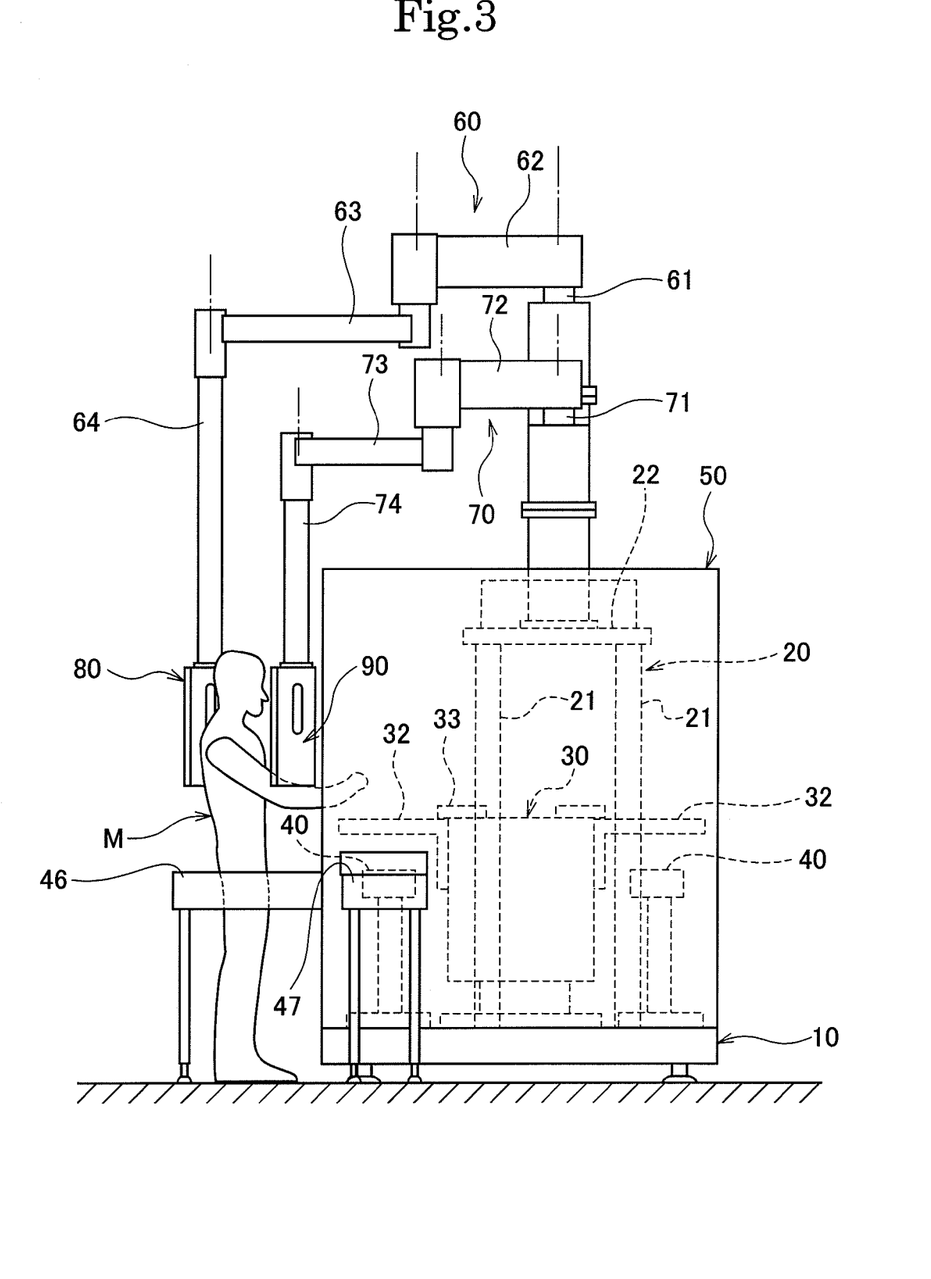
FIG. 3 is a side view of the production device depicted in FIG. 1.

As shown FIG. 2 and FIG. 3, the portal frame 20 includes four longitudinal frames 21 fixed on the base 10, a tabular transverse frame 22 connected to upper end portions of the longitudinal frames 21, and others. Furthermore, the transverse frame 22 is formed to support the first movable holding mechanism 60 and the second movable holding mechanism 70.

Figure 4:
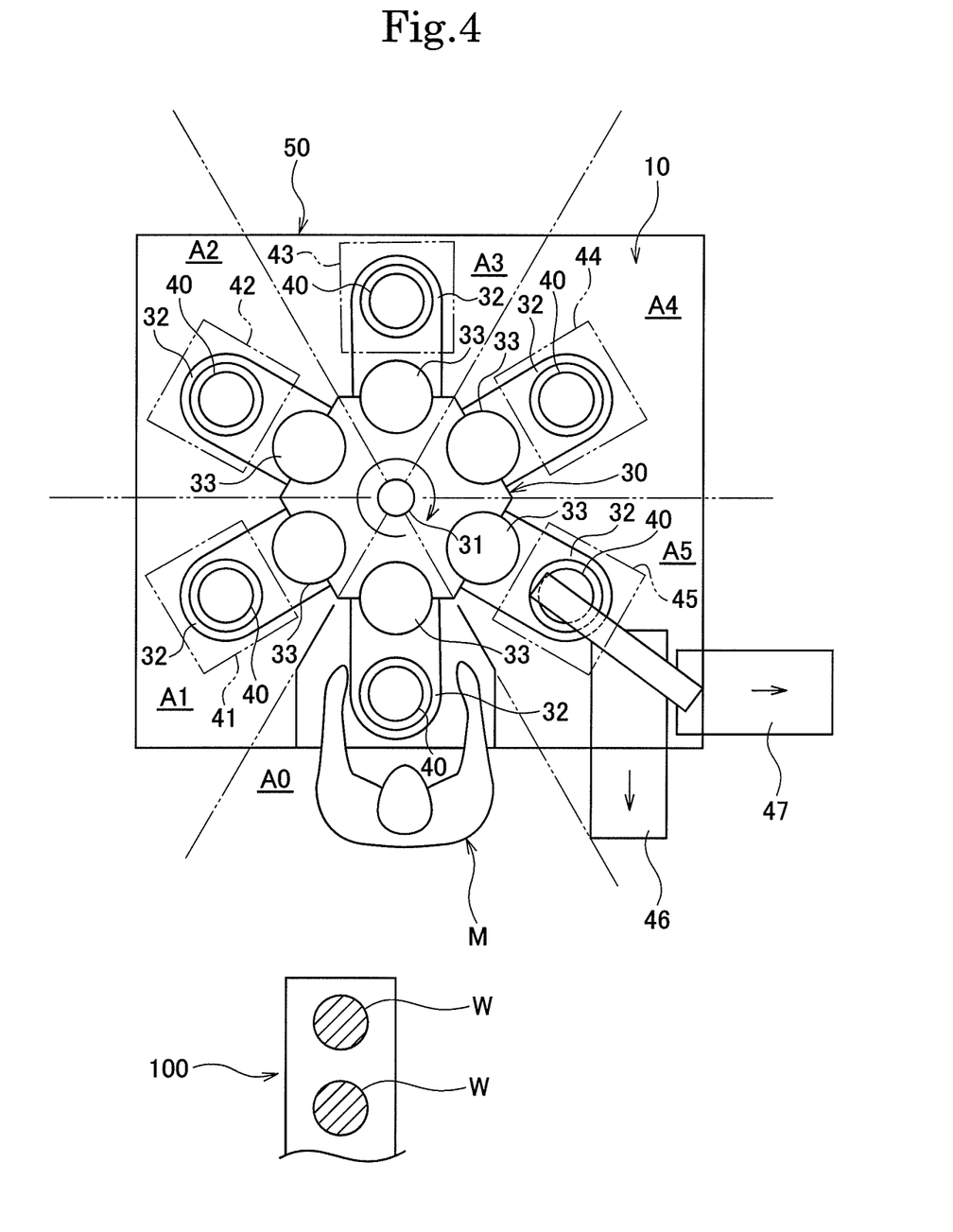
FIG. 4 is a plan view schematically showing the inside of the production device depicted in FIG. 1.

As shown in FIG. 2 to FIG. 4, the rotating table 30 includes a rotary shaft 31, six holding transfer units 32 that are arranged in a circumferential direction at equal intervals to hold workpieces W and supply/receive the workpieces W to/from the processing table 40, six mounting portions 33 that are arranged to be adjacent to the holding transfer units 32 and configured to hold a part of each of the workpieces W, a motor (not shown) that intermittently rotates and drives the rotary shaft 31 at predetermined angles.

The holding transfer units 32 are configured to supply the workpieces W onto the processing tables 40 arranged in the plurality of processing areas A0, A1, A2, A3, A4, and A5 and receive the workpieces W from the processing tables 40.

Further, after an operator M lifts up the workpiece W mounted on the processing table 40 in the later-described manual processing area A0 by using the holding transfer unit 32, the rotating table 30 intermittently rotates about the rotary shaft 31 at predetermined angles (approximately 60 degrees in this example) to sequentially transport the workpiece W toward the plurality of later-described automatic processing areas A1, A2, A3, A4, and A5.

As shown in FIG. 4, the plurality of processing areas are sequentially arranged and defined around the rotating table 30, and the plurality of processing areas are configured to include the manual processing area A0 defined outside the cover case 50 so that the operator M can manually perform predetermined processing with respect to the workpiece W and the five automatic processing areas A1, A2, A3, A4, and A5 defined inside the cover case 50 so that predetermined processing can be automatically performed with respect to the workpiece W.

As shown in FIG. 4, the processing table 40 and others are arranged in the manual processing area A0. A mounting table 100 on which each workpiece W, which is to be transferred onto the processing table 40, is prepared and mounted by the operator M is arranged near the manual processing area A0.

Moreover, in the manual processing area A0, the operator M performs manual processing, e.g., temporary assembling of parts in assembly or setting of a jig with respect to the prepared workpiece W, and an operation of mounting this processed workpiece W onto the processing table 40 is carried out.

Additionally, in the manual processing area A0, the operator M positions the first monitor operation panel 80 to be adjacent to himself/herself and performs an operation of starting activation of the device or an operation of stopping the activation of the device in a regular state, and the above-described processing is manually carried out while monitoring the entire processing status.

As shown in FIG. 4, in the automatic processing area A1, the processing table 40, the processing unit 41, and others are arranged.

Further, in the automatic processing area A1, the processing unit 41 performs predetermined processing, for example, the processing unit 41 including a plurality of vision sensors (not shown) and others images a state of the workpiece W, and processing of checking whether the state of the workpiece W is OK or NG and others are automatically performed based on the imaging data.

As shown in FIG. 4, in the automatic processing area A2, the processing table 40, the processing unit 42, and others are arranged.

Furthermore, in the automatic processing area A2, the processing unit 42 performs predetermined processing, for example, press-fit processing for a temporarily assembled parts with respect to the workpiece W, processing of checking whether a state of the workpiece w to which the press-fit processing has been performed is OK or NG, and others are automatically performed.

In the automatic processing area A3, as shown in FIG. 4, the processing table 40, the processing unit 43, and others are arranged.

Moreover, in the automatic processing area A3, the processing unit 43 performs predetermined processing, e.g., transfer processing of transferring the jig that is useless after press-fit processing onto the mounting portion 33 and others are automatically performed.

In the automatic processing area A4, as shown in FIG. 4, the processing table 40, the processing unit 44, and others are arranged.

Additionally, in the automatic processing area A4, the processing unit 44 performs predetermined processing, for example, caulking processing for parts press-fitted into the workpiece W and others are automatically performed.

In the automatic processing area A5, as shown in FIG. 4, the processing table 40, the processing unit 45, the acceptable piece carrying-out line 46, a rejected piece carrying-out line 47, and others are arranged.

Further, in the automatic processing area A5, the processing unit 45 performs predetermined processing, e.g., processing of judging whether the workpiece W subjected to all types of processing is an acceptable piece (OK) or a rejected piece (NG), and carrying-out processing of carrying out the acceptable piece from the acceptable piece carrying-out line 46 and carrying out the rejected piece from the rejected piece carrying-out line 47 is automatically performed. It is to be noted that the workpiece W that has been already determined as the rejected piece in the processing area on the upstream side is not subjected to the judging processing in the automatic processing area A5, and carrying-out processing of carrying out this workpiece W from the rejected piece carrying-out line 47 is automatically performed.

Figure 1:
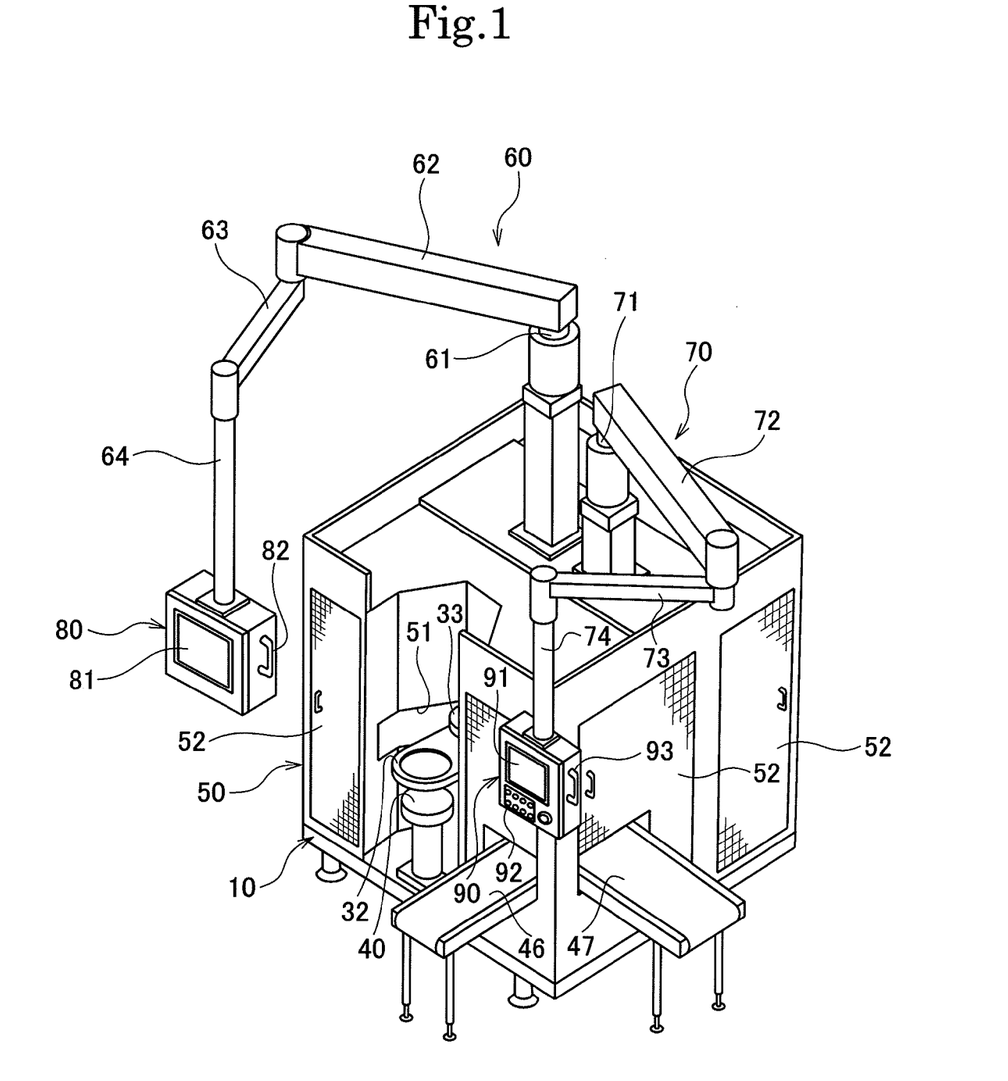
FIG. 1 is an external perspective view showing an embodiment of a production device according to the present invention.

As shown in FIG. 1 to FIG. 3, the cover case 50 is formed into a substantially rectangular parallelepiped shape so as to define an outer wall and a top wall, accommodate the rotating table 30 and the automatic processing areas A1, A2, A3, A4, and A5, and cover the entire device.

Furthermore, the cover case 50 is formed of an external wall member such as a lattice, mesh, or acrylic resin plate so that processing in the automatic processing areas A1, A2, A3, A4, and A5 can be monitored from the outside.

Moreover, the cover case 50 includes an opening door 51 that is automatically opened/closed to allow movement of the holding transfer units 32 and the mounting portions 33 toward the internal automatic processing area A1 from the manual processing area A0 placed outside or toward the manual processing area A0 placed outside from the internal automatic processing area A5, a plurality of operation doors 52 formed in accordance with the respective processing areas so that the operator M can perform predetermined adjustment operation with respect to the processing units 41, 42, 43, 44, 45, and others in the automatic processing areas A1, A2, A3, A4, and A5.

As shown in FIG. 1 to FIG. 3 and FIG. 5, the first articulated arm 60 is formed to include a first support shaft that is fixed to a position (a predetermined position) deviating from the center of the transverse frame 22 of the portal frame 20 by a predetermined distance and extends in a vertical direction, a first support-side arm 62 that is rotatably supported by the first support shaft 61 to allow its swiveling motion, a first end-side arm 63 rotatably connected to an end portion of the first support-side arm 62 to allow its swiveling motion, and a first suspended arm 64 that is connected to an end portion of the first end-side arm 63 to be suspended downwards and holds the first monitor operation panel 80 at a lower end portion thereof.

Furthermore, the first articulated arm 60 swivels the first support-side arm 62 about the first support shaft 61, swivels the first end-side arm 63 about the end portion of the first support-side arm 62, and swivels the first monitor operation panel 80 held at the lower end portion of the first suspended arm 64 about the end portion of the first end-side arm 63, whereby the first monitor operation panel 80 is held so as to be freely moved to a desired position within a horizontal plane around an outer wall of the cover case 50 and directed and positioned in a desired direction.

As shown in FIG. 1 to FIG. 3 and FIG. 5, the second articulated arm 70 is formed to include a second support shaft 71 that deviates from the center of the transverse frame 22 of the portal frame 20 by a predetermined distance and fixed to a position (a predetermined position) adjacent to the first support shaft 61 to extend in the vertical direction, a second support-side arm 72 rotatably supported by the second support shaft 71 to allow its swiveling motion, a second end-side arm 73 rotatably connected to an end portion of the second support-side arm 72 to allow its swiveling motion, and a second suspended arm 74 that is connected to an end portion of the second end-side arm 73 to be suspended downwards and holds the second monitor operation panel 90 at a lower end portion thereof.

Furthermore, the second articulated arm 70 swivels the second support-side arm 72 about the second support shaft 71, swivels the second end-side arm 73 about the end portion of the second support-side arm 72, and swivels the second monitor operation panel 90 held at the lower end of the second suspended arm 74 about the end portion of the second end-side arm 73, whereby the second monitor operation panel 90 is held so as to be freely moved to a desired position within a horizontal plane around the outer wall of the cover case 50 and directed and positioned in a desired direction.

Here, as shown in FIG. 1 and FIG. 2, the first articulated arm 60 and the second articulated arm 70 are formed in a relationship that the first support shaft 61 becomes higher than the second support shaft 71 in the vertical direction. Moreover, the first support-side arm 62 is formed to be longer than the first end-side arm 63, and the second support-side arm 72 is formed to be longer than the second end-side arm 73.

Figure 5:
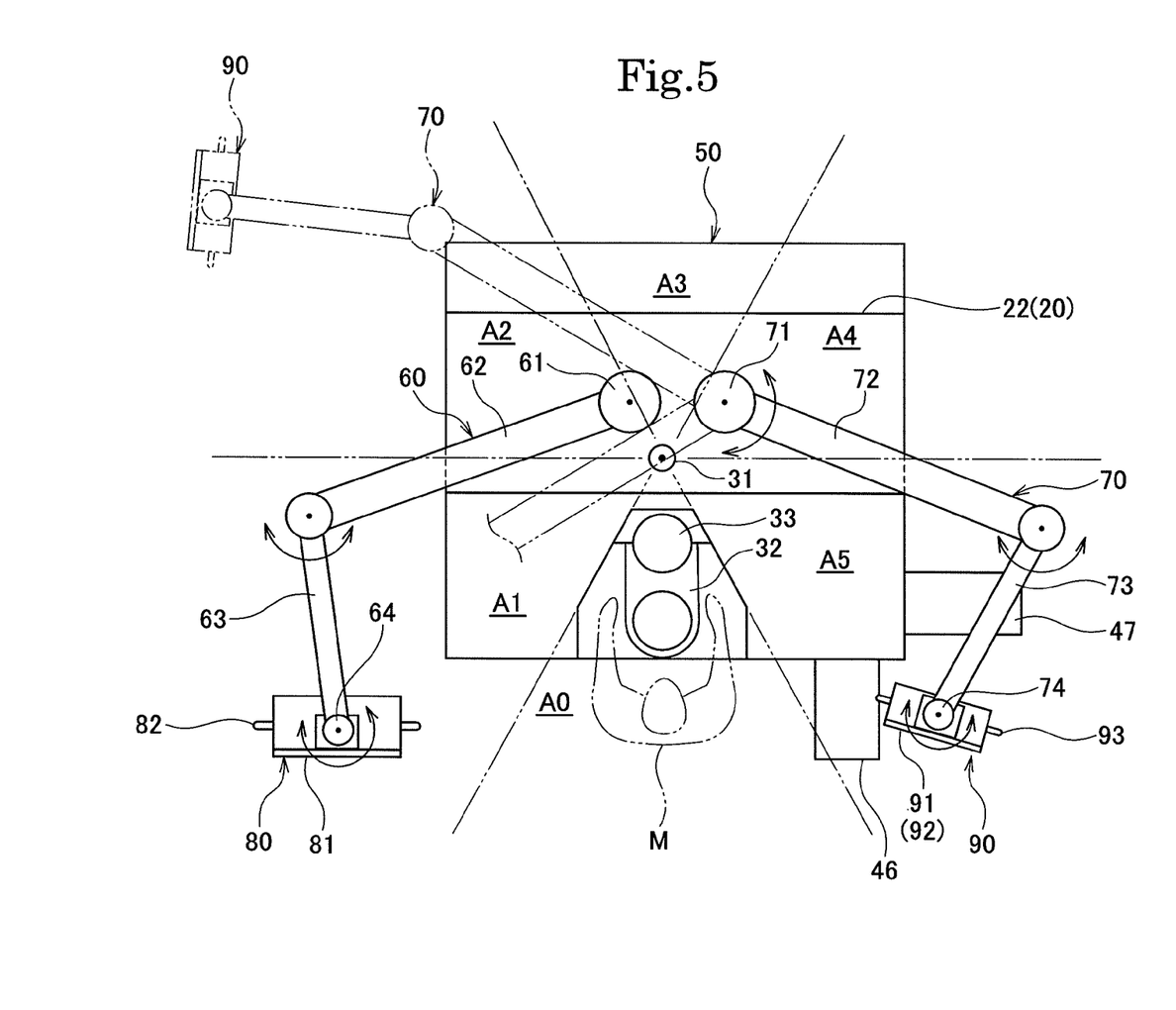
FIG. 5 is a plan view showing a first movable holding mechanism (and a first monitor operation panel) and a second movable holding mechanism (and a second monitor operation panel) included in the production device depicted in FIG. 1.

As a result, as shown in FIG. 5, the first articulated arm 60 can freely move the first monitor operation panel 80 about the first support shaft 61 thorough an angle of 360 degrees around the outer wall of the cover case 50. Further, as shown in FIG. 5, the second articulated arm 70 can reciprocatably rotate the second monitor operation panel 90 about the second support shaft 71 around the external wall of the cover case 50 except a region where it crosses the first support shaft 61 of the first articulated arm 60.

It is to be noted that, in the relationship between the first articulated arm 60 and the second articulated arm 70, the first support-side arm 62 may be formed to be longer than the second support-side arm 72. In this case, for example, when the second end-side arm 73 of the second articulated arm 70 is folded, the first articulated arm 60 can swivel through an angle of 360 degrees to move the first monitor operation panel 80 to a desired position without being hindered by the second articulated arm 70. Furthermore, the first support-side arm 62 may be formed to have the same length as that of the second support-side arm 72. In this case, for example, when the second end-side arm 73 of the second articulated arm 70 is folded and the second end-side arm 63 is extend outwards, the first articulated arm 60 can swivel through an angle of 360 degrees to move the first monitor operation panel 80 to a desired position without being hindered by the second articulated arm 70.

Since the articulated arms 60 and 70 are adopted as the first movable holding mechanism and the second movable holding mechanism as described above, the first monitor operation panel 80 and the second monitor operation panel 90 can be individually freely moved within a horizontal plane toward any desired one of the plurality of processing areas A0, A1, A2, A3, A4, and A5 while achieving simplification of the construction.

Moreover, the lower end portion of the first suspended arm 64 and the lower end portion of the second suspended arm 74 are formed so as to be located at the same height in the vertical direction. That is, the first monitor operation panel 80 and the second monitor operation panel 90 are held at the same height in the vertical direction as shown in FIG. 2.

Since the first monitor operation panel 80 and the second monitor operation panel 90 are held at the same height (near an eye line of the operator M) as described above, operability of the first monitor operation panel 80 and the second monitor operation panel 90 is improved, and the operator M can move both the panels closer to each other to perform visual confirmation and operations at the same time.

As shown in FIG. 1 and FIG. 2, the first monitor operation panel 80 is held by the first articulated arm 60, and the first monitor operation panel includes a touch panel type display unit 81 that can display various kinds of information and enables an environment setting operation (e.g., initial setting or change setting), an activation start/stop setting operation, or an information confirming operation, a grip portion 82 gripped by the operator M for movements, and others. That is, the first monitor operation panel 80 is configured to have at least functions for a setting operation concerning activation and stop of the entire device and for monitoring an operating status of the entire device.

Moreover, in this production device, the operator M can operate the first monitor operation panel 80 when mainly performing, e.g., activation and stop of the device.

As shown in FIG. 1 and FIG. 2, the second monitor operation panel 90 is held by the second articulated arm 70, and the second monitor operation panel includes a touch panel type display unit 91 that can display various kinds of information and enables various setting operations and confirming operations concerning the respective processing units 41, 42, 43, 44, and 45, an operation button 92 that likewise enables setting operations and others, a grip portion 93 gripped by the operator M for movements, and others. That is, the second monitor operation panel 90 is configured to have at least functions for settings and monitoring concerning respective types of processing.

Additionally, the operator M can operate the second monitor operation panel 90 when mainly monitoring the respective automatic processing areas A1, A2, A3, A4, and A5 and adjusting processing (e.g., adjustment for performing recovery processing when troubles have occurred).

As described above, using the two monitor operation panels 80 and 90 properly in accordance with their functions enables improving productivity.

Figure 6:
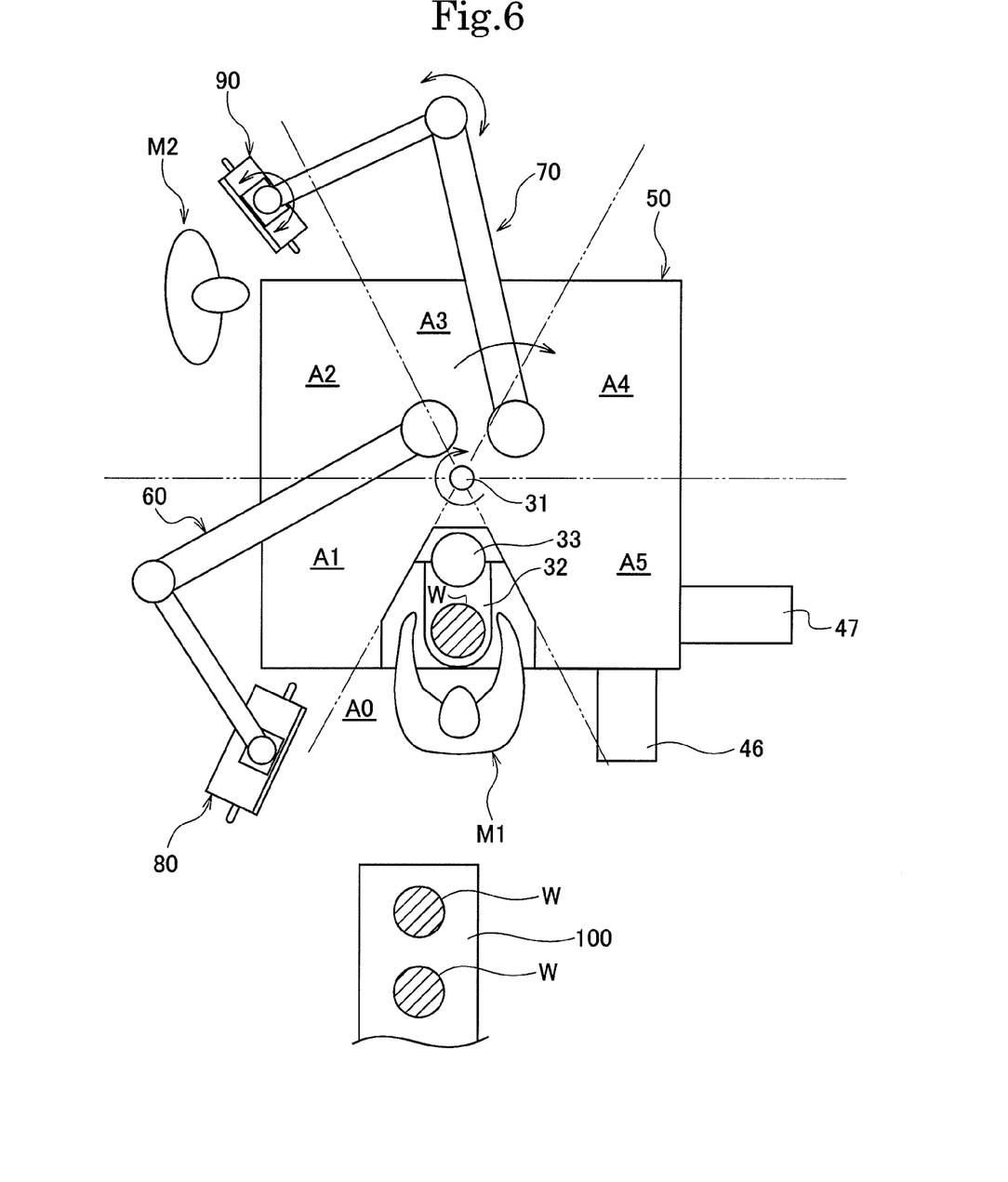
FIG. 6 is a plan view showing a state of the first monitor operation panel and the second monitor operation panel at the time of regular activation in the production device depicted in FIG. 1.
Figure 7:
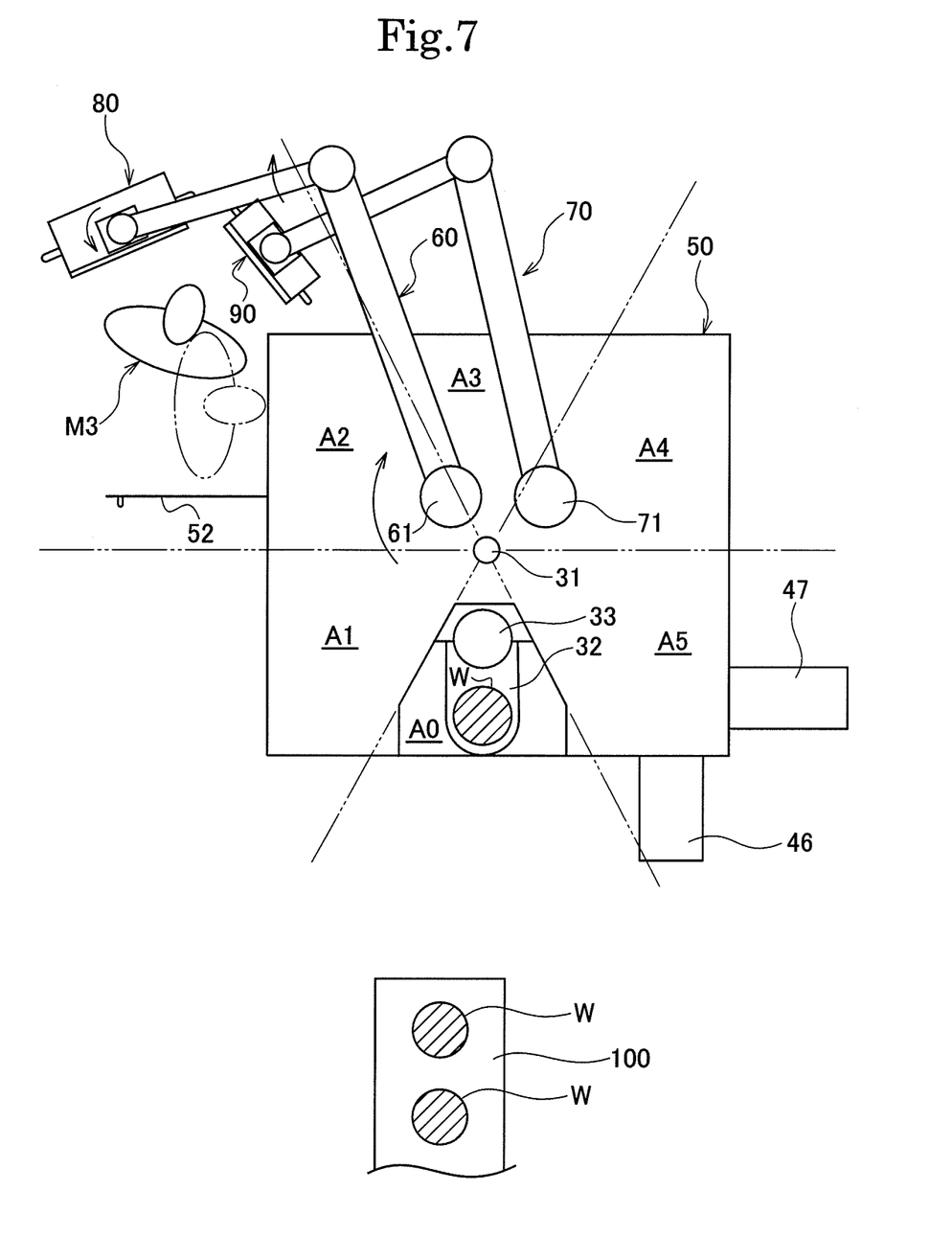
FIG. 7 is a plan view showing a state of the first monitor operation panel and the second monitor operation panel when, e.g., a trouble has occurred in a predetermined processing area in the production device depicted in FIG. 1.

Further, since the first monitor operation panel 80 is movable toward the plurality of processing areas A0 to A5 by the first articulated arm 60 and the second monitor operation panel 90 is movable toward the plurality of processing areas A0, A1, A2, A3, A4, and A5 by the second articulated arm 70, namely, since the two monitor operation panels 80 and 90 are independently movable toward the plurality of processing areas A0, A1, A2, A3, A4, and A5, for example, one operator M1 can confirm an operating status of the entire device while monitoring the first monitor operation panel 80 and another operator M2 can move the second monitor operation panel 90 and monitor the respective automatic processing areas A1, A2, A3, A4, and A5 to confirm presence/absence of a failure as shown in FIG. 6, and one operator M3 can move the first monitor operation panel 80 and the second monitor operation panel 90 at the same time to a predetermined automatic processing area A1, A2, A3, A4, or A5 to carry out, e.g., a recovery operation for failures.

Furthermore, the first monitor operation panel 80 and the second monitor operation panel 90 are connected to each other to enable sharing the same hierarchical information concerning processing for the workpieces W and enable accessing the counterpart to set or change information concerning processing of this counterpart.

For example, performing a setting operation in the second monitor operation panel 90 enables, e.g., changing setting information in the first monitor operation panel 80, and performing the setting operation in the first monitor operation panel 80 enables, e.g., changing setting information in the second monitor operation panel 90.

According to this configuration, since the first monitor operation panel 80 and the second monitor operation panel 90 have the same configuration as that in an example where both the monitor operation panels have the mutual functions, operations such as changing various kinds of settings concerning both the monitor operation panels can be carried out at a time, whereby the setting operations can be performed further smoothly and efficiently.

Here, priorities of the first monitor operation panel 80 and the second monitor operation panel 90 can be set and, for example, these monitor operation panels can be set in such a manner that the second monitor operation panel 90 cannot issue an activation command while the first monitor operation panel 80 is indicating an activation stop.

In the production device having the above-described configuration, the operator M can stop the first monitor operation panel 80 near the manual processing area A0 to activate the device and monitor entire processing and, on the other hand, when a trouble has occurred in any one of the automatic processing areas A1, A2, A3, A4, and A5, the first monitor operation panel 80 can be utilized to perform a stop operation and the second monitor operation panel 90 can be moved to this processing area to carry out a predetermined adjustment operation for recovery using the second monitor operation panel 90 while confirming a state in this processing area.

Moreover, in a regular operating status, another operator M can monitor a processing state in each automatic processing area while moving the second monitor operation panel 90 to each of the automatic processing areas A1, A2, A3, A4, and A5, whereby an adjustment operation for stop and recovery can be immediately carried out when a trouble has occurred.

Since the first monitor operation panel 80 and the second monitor operation panel 90 are configured to be movable toward the plurality of processing areas A0, A1, A2, A3, A4, and A5, an operator can monitor entire processing in the production device that produces, e.g., machine components or electronic components while achieving simplification of the construction and a reduction in cost, and the operator can smoothly perform a recovery operation for a trouble that has occurred in each automatic processing area, adjustment operation for it, and others as required.

Initializing operation of the production device, processing operations at the time of activation, occurrence of a trouble, and others will now be described with reference to FIG. 6 and FIG. 7.

The first monitor operation panel 80 is first positioned near the manual processing area A0, and one operator M1 performs a predetermined processing operation with respect to the workpiece W in order to start production and carries out a transfer operation of transferring this workpiece W onto the processing table 40.

On the other hand, another operator M2 moves the second monitor operation panel 90 to the automatic processing areas A1, A2, A3, A4, and A5 in order and performs initialization concerning the processing units 41, 42, 43, 44, and 45 in the respective automatic processing areas.

Upon completion of the setting operation, the operator M1 in the manual processing area A0 operates the first monitor operation panel 80 to activate the device. At the same time, the other operator M2 confirms a processing state in each of the automatic processing areas A1, A2, A3, A4, and A5 while moving together with the second monitor operation panel 90 along the outer wall of the cover case 50 and performs an adjustment operation of adjusting setting information of each of the processing units 41, 42, 43, 44, and 45 as required so that an optimum operating state can be provided.

Additionally, upon completion of all of the adjustment operation, as shown in FIG. 6, the one operator M1 carries out an operation of carrying in the workpiece W while appropriately confirming the operating state of the entire device by using the first monitor operation panel 80 in the manual processing area A0, and the other operator M2 moves the second monitor operation panel 90 and sequentially monitors the respective automatic processing areas A1, A2, A3, A4, and A5 to confirm presence/absence of troubles.

Here, when a trouble has occurred in any automatic processing area, the operator M1 in the manual processing area A0 operates the first monitor operation panel 80 to stop the activation, and the other operator M2 operates the second monitor operation panel 90 to carry out a recovery operation with respect to this trouble.

It is to be noted that, as shown in FIG. 7, one operator M3 may move the first monitor operation panel 80 and the second monitor operation panel 90 together to an automatic processing area where a trouble has occurred, carry out a recovery operation with respect to the trouble, and then activate the device in this automatic processing area to confirm an operating state (a processing state) after the recovery operation.

Further, when the recovery operation is finished, the processing returns to the state depicted in FIG. 6, and the one operator M1 operates the first monitor operation panel 80 to reactivate the device, and the other operator M2 continues monitoring the entire automatic processing areas.

It is to be noted that this procedure is just an example, and the operators M may perform the setting operation, the monitoring operation, and others based on any other technique.

Figure 8:
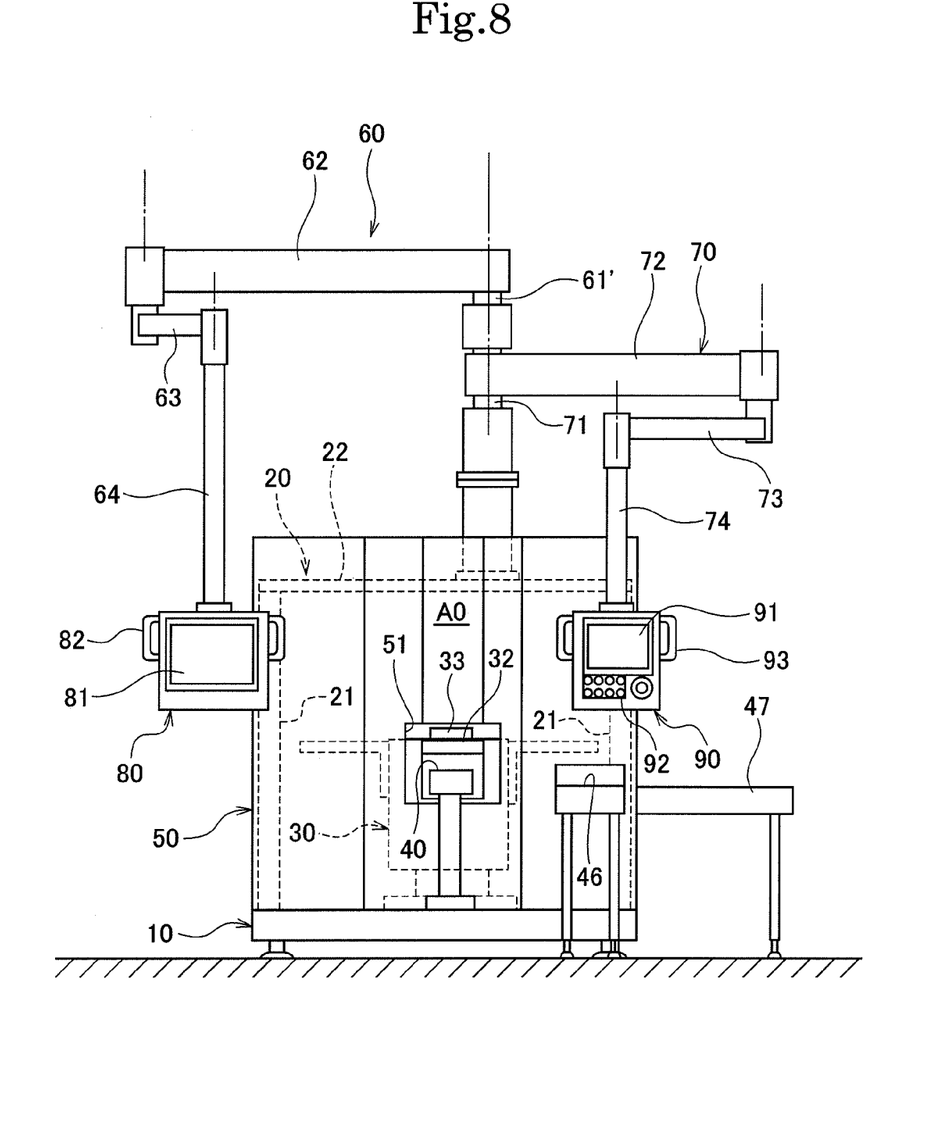
FIG. 8 is a front view showing another embodiment of the production device according to the present invention.

FIG. 8 is a front view showing another embodiment of a production device according to the present invention. This embodiment has the same configuration as that in the foregoing embodiment except that the first support shaft 61 of the first articulated arm 60 and the second support shaft of the second articulated arm 70 are coaxially arranged, and hence the same reference numerals denote the same structures to omit a description thereof.

In this embodiment, as shown in FIG. 8, a second support shaft 71 of a second articulated arm 70 and a first support shaft 61' of a first articulated arm 60 are coaxially arranged.

According to this configuration, a first monitor operation panel 80 can be rotated through an angle of 360 degrees by just swiveling the first articulated arm 60 in a state where both or one of a first end-side arm 63 and a second end-side arm 73 is bent to avoid collision of these arms, and a second monitor operation panel 90 can be rotated through an angle of 360 degrees by just swiveling the second articulated arm 70.

According to this production device, the first articulated arm 60 and the second articulated arm 70 can freely swivel without hindering each other, each of the first monitor operation panel 80 and the second monitor operation panel 90 can be more freely moved to a desired position, an operator can monitor entire processing when performing predetermined operation in a plurality of processing areas to produce, e.g., machine components or electronic components while achieving simplification of the construction, a reduction in cost, and others, and the operator can smoothly carry out a recovery operation with respect to troubles in respective automatic processing areas and an operation for it as required, whereby overall productivity can be improved.

Figure 9A:
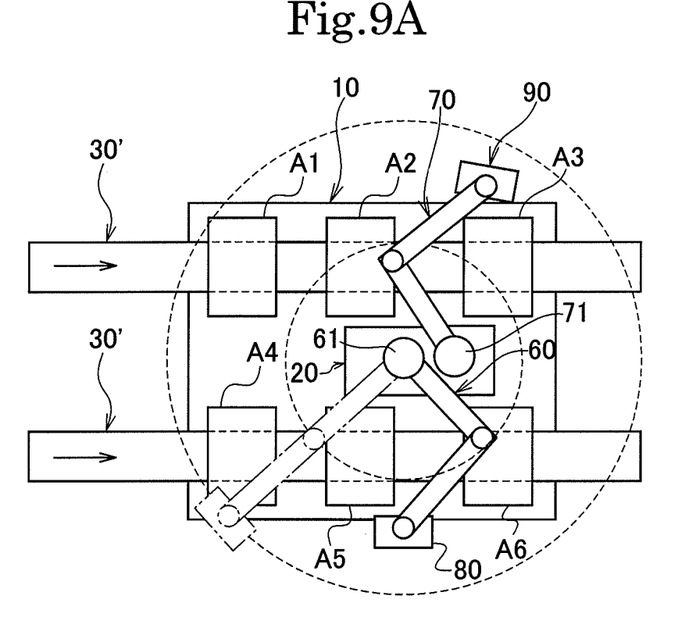
FIG. 9A is a schematic view showing still another embodiment of the production device according to the present invention.
Figure 9B:
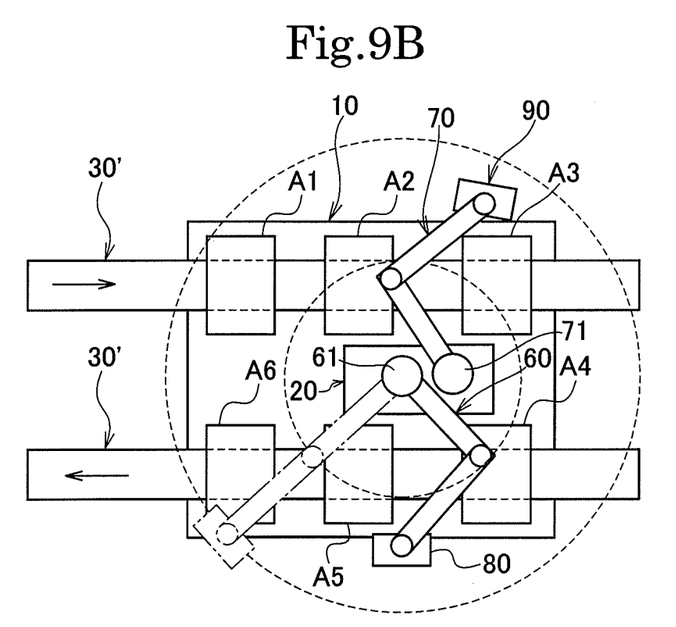
FIG. 9B is a schematic view showing yet another embodiment of the production device according to the present invention.

FIG. 9A and FIG. 9B are plan views showing still another embodiment of a production device according to the present invention. The production device according to this embodiment likewise includes a base 10, a portal frame 20, a plurality of processing areas A1, A2, A3, A4, A5, and A6 that are arranged along conveyers 30' and includes processing units respectively, a first articulated arm 60 as a first movable holding mechanism, a second articulated arm 70 as a second movable holding mechanism, a first monitor operation panel 80, a second monitor operation panel 90, and others except that the conveyers 30' that linearly transport workpieces W are adopted in place of the rotating table 30. It is to be noted that a column support may be provided in place of the portal frame 20.

In this embodiment, the two conveyers 30' are arranged in parallel, and the two conveyers transport the workpieces W in the same direction in the device depicted in FIG. 9A, while the two conveyers transport the workpieces W in opposed directions in the device shown in FIG. 9B.

According to this production device, like the above explanation, when performing predetermined processing in a plurality of automatic processing areas to produce, e.g., machine components or electronic components while achieving simplification of the construction, a reduction in cost, and others, an operator can monitor entire processing and smoothly perform a recovery operation with respect to troubles in the respective automatic processing areas and an operation for it as required, whereby entire productivity can be improved.

Although the six processing areas are exemplified as a plurality of processing areas in the foregoing embodiments, the present invention is not limited thereto, and the present invention may be adopted in a production device including five or less processing areas or seven or more processing areas.

Although the configuration that the articulated arms are adopted as the first movable holding mechanism and the second movable holding mechanism has been explained in the foregoing embodiments, the present invention is not limited thereto, and a triaxial suspension arm may be adopted, or any other movable holding mechanism that three-dimensionally moves a monitor operation panel may be adopted.

Although the configuration that the first movable holding mechanism and the second movable holding mechanism (the first articulated arm 60 and the second articulated arm 70) hold the monitor operation panels 80 and 90 alone at the end portions thereof has been explained in the foregoing embodiments, the present invention is not limited thereto, and utility functions such as a plug socket or an LAN may be provided in addition to the monitor operation panels 80 and 90, or a portable notebook computer and others may be held as the monitor operation panels.

Although the configuration that the first support shaft 61 is formed to be higher than the second support shaft 71 in the relationship between the first articulated arm 60 and the second articulated arm 70 has been explained in the foregoing embodiments, the present invention is not limited thereto, and a configuration that the second support shaft 71 is formed to be higher than the first support shaft 61 as a reverse pattern may be adopted. In this case, the second monitor operation panel 90 held by the second articulated arm 70 can be freely rotated through an angle of 360 degrees.

As described above, in the production device according to the present invention, when performing predetermined processing in the plurality of processing areas to produce, e.g., machine components or electronic components while achieving simplification of the construction, a reduction in cost, and others, an operator can monitor the entire processing and smoothly perform a recovery operation with respect to troubles in the respective processing areas and an operation for it as required, whereby this production device can be of course utilized in a production field dealing with machine components, electronic components, and others and it can be also useful in any other production field dealing with other components, products, and others.

The invention claimed is:

1. A production device comprising:
a plurality of processing units arranged to continuously perform a plurality of types of processing with respect to a workpiece;
a transport unit configured to sequentially transport the workpiece toward the plurality of processing units;
a plurality of monitor operation panels having setting and monitoring functions concerning overall activation and stop in the plurality of processing units or setting and monitoring functions concerning each processing; and
a plurality of movable holding mechanisms configured to hold the plurality of monitor operation panels so as to be movable toward each of the plurality of processing units.

2. The production device according to claim 1, wherein the transport unit includes a rotating table that holds the workpiece and intermittently rotates, and
the movable holding mechanisms are formed to hold the monitor operation panels so as to be movable toward the plurality of processing units arranged around the rotating table.

3. The production device according to claim 1, wherein the transport unit includes a conveyer that holds and intermittently transports the workpiece, and
the movable holding mechanisms are formed to hold the monitor operation panels so as to be movable toward the plurality of processing units arranged along the conveyer.

4. The production device according to claim 1, further comprising:
a base on which the plurality of processing units are mounted and fixed and which is configured to be arranged below the transport unit;
a support frame fixed on the base; and
a plurality of support shafts fixed to the support frame,
wherein the plurality of movable holding mechanisms are rotatably supported with respect to the plurality of support shafts, respectively.

5. The production device according to claim 1, further comprising:
a base on which the plurality of processing units and the transport unit are mounted and fixed;
a support frame fixed on the base; and
a plurality of support shafts provided upright on the support frame,
wherein the plurality of movable holding mechanisms are rotatably supported with respect to the plurality of support shafts, respectively.

6. The production device according to claim 5, wherein the movable holding mechanism includes a support-side arm rotatably supported by the support shaft, an end-side arm rotatably connected to an end portion of the support-side arm, and a suspended arm connected to an end portion of the end-side arm to be suspended downwards and configured to rotatably hold the monitor operation panel at a lower end portion thereof.

7. The production device according to claim 6, wherein the plurality of support shafts rotatably support the respective support-side arms at positions having different heights, and the support-side arm is formed to be longer than the end-side arm.

8. The production device according to claim 5, wherein the support frame includes a portal frame, and the plurality of support shafts are fixed to an upper portion of the portal frame.

9. The production device according to claim 8, wherein the plurality of support shafts are arranged to be adjacent to each other in parallel.

10. The production device according to claim 8, wherein the plurality of support shafts are coaxially arranged.

* * * * *